United States Patent [19]
Cilley
[11] Patent Number: 4,601,844
[45] Date of Patent: Jul. 22, 1986

[54] GRANULAR AUTOMATIC DISHWASHER DETERGENT WITH ALKYL PHOSPHATE AND CALCIUM ION SOURCE

[75] Inventor: William A. Cilley, Cincinnati, Ohio
[73] Assignee: The Procter & Gamble Company, Cincinnati, Ohio

[21] Appl. No.: 779,310
[22] Filed: Sep. 24, 1985

Related U.S. Application Data

[63] Continuation of Ser. No. 646,611, Aug. 31, 1984, abandoned.

[51] Int. Cl.⁴ ........................ B01D 19/04; C11D 1/34; C11D 1/825; C11D 3/02
[52] U.S. Cl. ........................ 252/95; 252/89.1; 252/99; 252/135; 252/174.16; 252/174.21; 252/358
[58] Field of Search ........................ 252/99, 135, 174.16, 252/174.21, 358, 95

[56] References Cited

U.S. PATENT DOCUMENTS

| | | | |
|---|---|---|---|
| 2,895,916 | 7/1959 | Milenkevich et al. | 252/99 |
| 3,314,891 | 4/1967 | Schmolka et al. | 252/174.21 |
| 3,332,874 | 7/1967 | Coward | 252/545 |
| 3,332,876 | 7/1967 | Walker | 252/541 |
| 3,520,815 | 7/1970 | Wessells | 252/99 |
| 3,630,923 | 12/1971 | Simmons | 252/99 |
| 3,821,118 | 6/1974 | Finck | 252/99 |
| 4,362,642 | 12/1982 | Carter | 252/174.16 |
| 4,465,613 | 8/1984 | Carter | 252/174.16 |

FOREIGN PATENT DOCUMENTS

| | | |
|---|---|---|
| 209882 | 12/1955 | Australia . |
| 2358374 | 12/1972 | Fed. Rep. of Germany . |
| 1189114 | 4/1970 | United Kingdom . |
| 1396678 | 6/1975 | United Kingdom . |
| 2058823A | 4/1981 | United Kingdom . |

*Primary Examiner*—Dennis L. Albrecht
*Attorney, Agent, or Firm*—Darla P. Neaveill; Richard C. Witte; Thomas H. O'Flaherty

[57] ABSTRACT

Granular detergent compositions suitable for use in automatic dishwashing machines are disclosed. The compositions contain detergency builder materials, a chlorine bleach component, a low-foaming nonionic surfactant compatible with the bleach and suds control components comprising an alkyl phosphate ester and a source of calcium ions.

15 Claims, No Drawings

GRANULAR AUTOMATIC DISHWASHER DETERGENT WITH ALKYL PHOSPHATE AND CALCIUM ION SOURCE

This is a continuation of application Ser. No. 646,611, filed on Aug. 31, 1984, now abandoned.

BACKGROUND OF THE INVENTION

Field of the Invention

This invention relates to detergent compositions which are particularly suitable for use in automatic dishwashers. Such compositions are normally alkaline and contain detergency builder materials, relatively low levels of low sudsing surfactants and a source of available chlorine.

SUMMARY OF THE INVENTION

This invention is based on modifications in conventional, automatic dishwasher detergent compositions that provide surprisingly effective cleaning and absence of spotting and filming while maintaining an acceptably low level of sudsing. In particular the invention relates to automatic dishwasher detergent compositions containing a chlorine bleach ingredient, a surfactant compatible with said bleach ingredient and effective suds control components for said surfactant which comprise:

(1) from about 20% to about 95%, preferably from about 40% to about 90%, by weight of a detergency builder material or mixtures thereof on an anhydrous basis;

(2) a chlorine bleach ingredient to provide from about 0.5% to about 5%, preferably from about 1% to about 3%, of available chlorine based on the weight of the detergent composition;

(3) from about 1% to about 15%, preferably from about 2% to about 8%, of a low foaming, nonionic surfactant which is solid at 35° C. (95° F.), preferably an ethoxylated nonionic surfactant derived from the reaction of a monohydroxy alcohol or alkylphenol in which the alkyl group contains from about 8 to about 20 carbon atoms, excluding cyclic carbon atoms, with from about 6 to about 15 moles of ethylene oxide per mole of alcohol or alkylphenol on an average basis;

(4) from about 1% to about 50%, preferably from about 2% to about 20%, based on the weight of the nonionic surfactant, of alkyl phosphate ester or mixtures thereof, preferably mono $C_{18}$ alkyl phosphate esters and/or di $C_{18}$ alkyl phosphate esters; and (5) a water-soluble or water-solubilizable calcium-containing material to provide at least about 25% by weight of the calcium ions which will react with said alkyl phosphate ester to form a more effective suds suppressor.

DETAILED DESCRIPTION OF THE INVENTION

Detergency Builder Material

Compositions of the invention contain from about 20% to about 95%, preferably from about 40% to about 90%, by weight of detergency builder component or mixtures thereof on an anhydrous basis.

The detergency builder material can be any of the detergent builder materials known in the art which include trisodium phosphate, tetrasodium pyrophosphate, sodium tripolyphosphate, sodium hexametaphosphate, sodium silicates having $SiO_2$:$Na_2O$ weight ratios of from about 1:1 to about 3.6:1, sodium carbonate, sodium hydroxide, sodium citrate, borax, sodium ethylenediaminetetraacetate, sodium nitrilotriacetate, sodium carboxymethyloxysuccinate, sodium carboxymethyloxymalonate, polyphosphonates, polymeric carboxylates such as polyacrylates, and mixtures thereof. Preferably, monomeric organic detergency builder materials comprise not more than about 10% of the composition by weight.

Preferred detergency builder materials have the ability to remove metal ions other than alkali metal ions from washing solutions by sequestration, which as defined herein includes chelation, or by precipitation reactions. Sodium tripolyphosphate is a particularly preferred detergency builder material which is a sequestering agent. Sodium carbonate is a preferred precipitation detergency builder, particularly when it is desirable to reduce the total phosphorous level of the compositions of the invention. Chlorinated trisodium orthophosphate can act as both a chlorine bleach and a precipitation detergency builder material.

The inclusion of water-soluble silicates, especially sodium silicates having $SiO_2$:$Na_2O$ weight ratios of from about 1:1 to about 3.6:1 is a particularly preferred embodiment of the invention. Such silicates are a source of alkalinity useful in the automatic dishwashing process and also act to inhibit the corrosion of aluminum, glassware and ceramic glazes.

Particularly preferred compositions of the invention contain from about 15% to about 50% sodium tripolyphosphate, from about 5% to about 40% of sodium silicate solids as described hereinbefore and from 0% to about 25% sodium carbonate by weight.

Chlorine Bleach Component

The compositions of the invention can contain a chlorine bleach ingredient to provide from about 0.5% to about 5%, preferably from about 1.0% to about 3%, of available chlorine based on the weight of the detergent composition.

An inorganic chlorine bleach ingredient such as chlorinated trisodium phosphate can be utilized, but organic chlorine bleaches such as the chlorocyanurates are preferred. Water-soluble dichlorocyanurates such as sodium or potassium dichloroisocyanurate dihydrate are particularly preferred.

Methods of determining "available chlorine" of compositions incorporating chlorine bleach materials such as hypochlorites and chlorocyanurates are well known in the art. Available chlorine is the chlorine which can be liberated by acidification of a solution of hypochlorite ions (or a material that can form hypochlorite ions in solution) and at least a molar equivalent amount of chloride ions. A conventional analytical method of determining available chlorine is addition of an excess of an iodide salt and titration of the liberated free iodine with a reducing agent.

The Nonionic Surfactant

The compositions of the invention contain from about 1% to about 15%, preferably from about 2% to about 8%, of a nonionic surfactant. In a preferred embodiment the surfactant is an ethoxylated surfactant derived form the reaction of a monohydroxy alcohol or alkylphenol containing from about 8 to about 20 carbon atoms, excluding cyclic carbon atoms, with from about 6 to about 15 moles of ethylene oxide per mole of alcohol or alkylphenol on an average basis.

A particulaly preferred ethoxylated nonionic surfactant is derived from a straight chain $C_{16-20}$ alcohol, preferably a $C_{18}$ alcohol, condensed with an average of from about 6 to about 15 moles, preferably from about 7 to about 12 moles, and most preferably from about 8 to about 9 moles of ethylene oxide per mole of alcohol. Preferably the ethoxylated nonionic surfactant so derived has a narrow ethoxylate distribution relative to the average.

The ethoxylated nonionic surfactant can optionally contain propylene oxide in an amount up to about 15% by weight of the surfactant and retain the advantages hereinafter described. Preferred surfactants of the invention can be prepared by the processes described in U.S. Pat. No. 4,223,163, issued Sept. 16, 1980, Guilloty, incorporated herein by reference.

The preferred surfactants of the invention in combination with the other components of the composition provide excellent cleaning and outstanding performance from the standpoints of absence of residual spotting and filming. In these respects, the preferred surfactants of the invention provide generally superior performance relative to ethoxylated nonionic surfactants with hydrophobic groups other than monohydroxy alcohols and alkylphenols, for example, polypropylene oxide or polypropylene oxide in combination with diols, triols and other polyglycols or diamines.

The surfactants of the invention are those that can be incorporated in compositions containing alkali metal dichlorocyanurates or other organic chlorine bleaches without an interaction that results in loss of available chlorine. The nature of this problem is disclosed in U.S. Pat. No. 4,309,299 issued Jan. 5, 1982 to Rapisarda et al and in U.S. Pat. No. 3,359,207, issued Dec. 19, 1967, to Kaneko et al, both patents being incorporated herein by reference.

As disclosed herein, the surfactants of the invention require suds control components for utility in the compositions of the invention.

Alkyl Phosphate Ester

The compositions of the invention contain from about 1% to about 50%, preferably from about 2% to about 20%, based on the weight of ethoxylated nonionic surfactant of alkyl phosphate ester or mixtures thereof.

Suitable alkyl phosphate esters are disclosed in U.S. Pat. No. 3,314,891, issued Apr. 18, 1967, to Schmolka et al, incorporated herein by reference.

The preferred alkyl phosphate esters contain from 16–20 carbon atoms. Highly preferred alkyl phosphate esters are monostearyl acid phosphate and monooleyl acid phosphate, or salts thereof, particularly alkali metal salts, or mixtures thereof.

The alkyl phosphate esters of the invention have been used to reduce the sudsing of detergent compositions suitable for use in automatic dishwashing machines. The esters are particularly effective for reducing the sudsing of compositions comprising nonionic surfactants which are heteric ethoxylated-propoxylated or block polymers of ethylene oxide and propylene oxide.

Sudsing of the ethoxylated monohydroxy alcohol or alkylphenol nonionics of the present invention is reduced by incorporation of the alkyl phosphate esters of the invention, but not always sufficiently to prevent a suds overflow or to maintain optimum spray arm speeds under a wide variety of soils, product usage levels, machine types and water conditions.

Calcium-Containing Material

The compositions of the invention contain a water-soluble or water-solubilizable calcium-containing material to provide from about 0.25 to about 2.5 moles, preferably from about 0.5 to about 1.5 moles per mole of the alkyl phosphate ester present.

A source of available calcium ions is necessary for consistent control of sudsing in the compositions of the invention. The compositions of the invention incorporate a calcium containing material because calcium from the water supply and soil is not necessarily sufficient, particularly when a household has a water-softening unit incorporated in the plumbing.

Convenient calcium-containing materials are the water-soluble salts of calcium such as preferred calcium chloride, calcium acetate, calcium bromide, etc. The calcium-containing material may comprise a calcium salt of components which are otherwise essential when incorporated as alkali metal or other monovalent cation salts. Preferably, however, the alkyl phosphate ester should not be totally or even partially present in the composition as a calcium salt. While not wishing to be bound by the theory, it is believed that the in-situ formation of the calcium salts of the alkyl phosphate ester during the washing process constitutes the mechanism by which superior suds control is obtained in the compositions of the invention.

Optional Ingredients

China protecting agents including soluble zinc and aluminum salts, aluminosilicates, aluminates, etc., can be present in amounts of from about 0.1% to about 5%, preferably from about 0.5% to about 2%.

Filler materials can also be present including sucrose, sucrose esters, sodium chloride, sodium sulfate, etc., in amounts from about 0.001% to about 60%, preferably from about 5% to about 30%.

Hydrotrope materials such as sodium benzene sulfonate, sodium toluene sulfonate, sodium cumene sulfonate, etc., can be present in minor amounts.

Dyes, perfumes, crystal modifiers and the like can also be added in minor amounts.

The compositions of the invention can be prepared in any manner that results in formation of a granular product form. The process described in U.S. Pat. No. 2,895,916 issued July 21, 1959, to Milenkevich et al, and variations thereof, are particularly suitable. Also particularly suitable is the process described in U.S. Pat. No. 4,427,417, issued Jan. 24, 1984 to Porasik. Both of these patents are incorporated herein by reference.

As used herein, all percentages, parts and ratios are by weight unless otherwise stated.

The following Examples illustrate the invention and facilitate its understanding.

EXAMPLE I

A. 33.1 Parts by weight of powdered anhydrous sodium tripolyphosphate and 8.0 parts by weight of hydrous sodium silicate (82% solids, $SiO_2$:$Na_2O$ weight ratio of 2.4) were added to a ribbon mixer. With the mixer in operation the following ingredients were added during a cycle time of 180 seconds.

(a) from 0 seconds to 165 seconds

A blend of 13.8 parts of an aqueous sodium silicate solution containing 47.3% silicate solids with a $SiO_2$:$Na_2O$ weight ratio of 2.0 and 4.7 parts of an aqueous sodium silicate solution containing 37.5% silicate solids with a $SiO_2$:$Na_2O$ weight ratio of 3.2 was added as a spray. This blend also contained minor amounts of perfume and dye.

(b) at 60 seconds 19.4 Parts of sodium sulfate and 10.0 parts of sodium carbonate were added dry.

(c) from 60 seconds to 165 seconds 4.0 Parts of a polyoxyalkylene nonionic surfactant (condensation product of $C_{18}$ alcohol with average of 8.25 moles ethylene oxide) and 0.2 parts of monostearyl acid phosphate were added as a spray.

(d) at 145 seconds 5.0 Parts of sodium chloride having a particle size such that at least 80% passed through a 100 Tyler mesh screen were added dry.

(e) after 180 seconds

Product was discharged from mixer.

(f)

2.5 Parts of sodium dichlorocyanurate dihydrate was added and mixed in after product discharged from the mixer at step (e) was dried to a water content of about 10 percent and aged for about 24 hours.

B. The process of A is repeated with the addition of 0.14 parts $CaCl_2$ incorporated in the aqueous sodium silicate solution of step (a).

Water lost during processing accounts for any excess over 100 parts in the Compositions A and B.

EXAMPLE II

Detergent compositions were prepared according to Example I A were tested with varying levels of the surfactant and monostearyl acid phosphate. The $CaCl_2$ was added either by dry mixing, or in the suds generator. The suds volume was measured by use of a laboratory suds generator consisting of a graduated cylinder modified to allow connection of a take-off tube through the side wall at the bottom, a small pump, tubing and a pipette tip nozzle. Solution flows out the bottom of the cylinder, through the pump and is squirted through the nozzle onto the top of the water column, generating suds according to a pre-determined flow rate.

Testing done at 130° F., 0% hardness.

| % MSAP | % Surfactant | Suds Volume (ml) |
|---|---|---|
| 0 | 1 | 110 |
| | 2 | 175 |
| | 3 | 200 |
| | 4 | 250 |
| .2 | 1 | 35 |
| | 2 | 200 |
| | 3 | 265 |
| | 4 | 265 |

EXAMPLE III

A detergent composition was prepared according to Example I A. Varying levels of $CaCl_2.2H_2O$ were added, and the suds volume was measured by use of a suds generator.

| % $CaCl_2 \cdot 2H_2O$ | Suds Volume (ml) |
|---|---|
| 0 | 280 |
| 0.1 | 90 |
| 0.2 | 80 |
| 0.3 | 70 |
| 0.4 | 55 |
| 0.5 | 50 |
| 0.6 | 46 |
| 0.7 | 46 |
| 0.8 | 48 |
| 0.9 | 50 |
| 1.0 | 50 |

-continued

EXAMPLE IV

A composition was prepared according to Example I A, and varying percentages of $CaCl_2$. $2H_2O$/MSAP (in 1:1 concentrations) were separately added. Suds measurements were made at 130° F. There was no hardness present prior to addition of the $CaCl_2$ and MSAP.

| % $CaCl_2 \cdot 2H_2O$/MSAP | Suds Volume (ml) |
|---|---|
| 0 | |
| 0.1 | 220 |
| 0.2 | 80 |
| 0.3 | 55 |
| 0.4 | 40 |
| 0.5 | 32 |
| 0.6 | 30 |

What is claimed is:

1. A low sudsing granular detergent composition suitable for use in an automatic dishwashing machine comprising on an anhydrous basis:

(a) from about 20% to about 95% by weight of a detergency builder material or mixtures thereof;

(b) a chlorine bleach ingredient to provide from about 0.5% to about 5% of available chlorine based on the weight of the detergent composition;

(c) from about 1% to about 15% of a low-foaming nonionic surfactant which is solid at 35° C. (95° F.)

(d) from about 5% to about 50%, based on the weight of the ethoxylated nonionic surfactant of an alkyl phosphate ester or mixtures thereof;

(e) from about 0.25 moles to about 2.5 moles of a water soluble or water solubilizable calcium containing material per mole of alkyl phosphate ester present.

2. The composition of claim 1 wherein said calcium containing material comprises a water soluble calcium salt.

3. The composition of claim 1 wherein said water-soluble calcium salt is calcium chloride.

4. The composition of claim 1 wherein said alkyl phosphate ester comprises an alkyl phosphate ester or diester containing from about 16 to about 20 carbon atoms or the monovalent salts thereof, or mixtures thereof.

5. The composition of claim 4 wherein said calcium containing material comprises a water-soluble calcium salt.

6. The composition of claim 4 wherein said water-soluble calcium salt is calcium chloride.

7. A low sudsing granular detergent composition suitable for use in an automatic dishwashing machine comprising:

(a) from about 40% to about 90% by weight of a detergency builder material, or mixtures thereof;

(b) an organic chlorine bleach component to provide from about 1% to about 3% of available chlorine based on the weight of the detergent composition;

(c) from about 2% to about 8% of an ethoxylated surfactant derived from the reaction of a monohydroxy alcohol or alkylphenol containing from about 8 to about 20 carbon atoms, exclusive of cyclic carbon atoms with from about 6 to about 15 moles of ethylene oxide per mole of alcohol or alkylphenol on an average basis.

(d) from about 5% to about 20% based on the weight of the ethoxylated nonionic surfactant of an alkyl phosphate ester selected from the group comprising mono $C_{18}$ alkyl acid phosphate, a mixture of mono $C_{18}$ alkyl acid phosphate and di-$C_{18}$ alkyl acid phosphate, and hydrates thereof and mixtures thereof;

(e) from about 0.5 moles to about 1.5 moles of water-soluble calcium salt per mole of alkyl phosphate ester present.

8. The composition of claim 7 wherein the said ethoxylated nonionic surfactant comprises a surfactant derived from a straight chain alcohol containing from about 16 to about 20 carbon atoms exclusive of cyclic carbon atoms condensed with an average of from about 7 to about 12 moles of ethylene oxide per mole of said alcohol.

9. The composition of claim 7 wherein the said ethoxylated nonionic surfactant comprises a surfactant derived from a straight chain $C_{18}$ alcohol condensed with an average from about 7 to about 9 moles of ethylene oxide per mole of said alcohol.

10. The composition of claim 8 wherein the detergency builder material or mixtures thereof comprise the material selected from the group consisting of sodium tripolyphosphate, sodium carbonate, sodium silicate and hydrates and mixtures thereof.

11. The composition of claim 7 wherein the alkali metal dichloroisocyanurate comprises sodium diisocyanurate dihydrate, potassium diisocyanurate dihydrate and mixtures thereof.

12. The composition of claim 8 wherein the water-soluble calcium salt is calcium chloride.

13. The composition of claim 7 wherein the detergency builder material or mixtures thereof comprise a material selected from the group consisting of sodium tripolyphosphate, sodium carbonate and sodium silicate and hydrates and mixtures thereof.

14. The composition of claim 7 wherein the organic chlorine bleach ingredient is a sodium dichloroisocyanurate dihydrate potassium dichloroisocyanurate dihydrate and mixtures thereof.

15. The composition of claim 7 wherein the water-soluble calcium salt is calcium chloride.

* * * * *